(12) United States Patent
Tertinek

(10) Patent No.: US 12,519,229 B2
(45) Date of Patent: Jan. 6, 2026

(54) COMMUNICATION DEVICE AND CORRESPONDING OPERATING METHOD

(71) Applicant: NXP B.V., Eindhoven (NL)

(72) Inventor: Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 324 days.

(21) Appl. No.: 17/817,372

(22) Filed: Aug. 4, 2022

(65) Prior Publication Data

US 2023/0065673 A1 Mar. 2, 2023

(30) Foreign Application Priority Data

Aug. 20, 2021 (EP) ..................................... 21192468

(51) Int. Cl.
*H01Q 5/25* (2015.01)
*H01Q 3/24* (2006.01)
*H04B 1/00* (2006.01)
*H04B 1/04* (2006.01)

(52) U.S. Cl.
CPC ................. *H01Q 5/25* (2015.01); *H01Q 3/24* (2013.01); *H04B 1/006* (2013.01); *H04B 1/0483* (2013.01)

(58) Field of Classification Search
CPC . H01Q 5/25; H01Q 3/24; H01Q 21/06; H04B 1/006; H04B 1/0483; G01S 3/46; G01S 5/12; G01S 7/006; G01S 13/765; G01S 3/043
USPC ........................................................ 455/132
See application file for complete search history.

(56) References Cited

U.S. PATENT DOCUMENTS

| | | | |
|---|---|---|---|
| 9,369,173 B1 | 6/2016 | Yoon | |
| 2007/0222697 A1* | 9/2007 | Caimi | H01Q 9/0421 343/861 |
| 2013/0309981 A1* | 11/2013 | Ngai | H04B 7/0608 455/78 |
| 2013/0310045 A1* | 11/2013 | Yan | H04B 7/0602 455/437 |
| 2017/0244432 A1* | 8/2017 | Ranta | H03H 7/40 |

(Continued)

OTHER PUBLICATIONS

Heydariaan, M., "AnguLoc: Concurrent Angle of Arrival Estimation for Indoor Localization with UWB Radios", 2020 16th International Conference on Distributed Computing in Sensor Systems (DCOSS), May 25-27, 2020.

*Primary Examiner* — Eugene Yun

(57) ABSTRACT

In accordance with a first aspect of the present disclosure, a communication device is provided, comprising: an ultra-wideband (UWB) communication unit configured to enable UWB communication with at least one external communication device, the UWB communication unit comprising a first receiver and a second receiver; a controller configured to control the UWB communication unit; wherein the controller is configured to cause the UWB communication unit to operate in a first mode in which the first receiver is alternately coupled to a first antenna and a second antenna; and wherein the controller is configured to cause the UWB communication unit to operate in a second mode in which the first receiver is coupled to the first antenna and the second receiver is coupled to the second antenna. In accordance with a second aspect of the present disclosure, a corresponding method of operating a communication device is conceived. In accordance with a third aspect of the present disclosure, a computer program is provided for performing said method.

20 Claims, 6 Drawing Sheets

(56) References Cited

U.S. PATENT DOCUMENTS

| | | |
|---|---|---|
| 2019/0170847 A1 | 6/2019 | Jamin et al. |
| 2020/0059208 A1 | 2/2020 | Yang et al. |
| 2021/0076350 A1* | 3/2021 | Yang .......................... G01S 3/50 |
| 2022/0166649 A1 | 5/2022 | Lafer et al. |

* cited by examiner

COMMUNICATION DEVICE AND CORRESPONDING OPERATING METHOD

CROSS-REFERENCE TO RELATED APPLICATIONS

This application claims the priority under 35 U.S.C. § 119 of European Patent application no. 21192468.3, filed on 20 Aug. 2021, the contents of which are incorporated by reference herein.

TECHNICAL FIELD

The present disclosure relates to a communication device. Furthermore, the present disclosure relates to a corresponding method of operating a communication device, and to a computer program for carrying out said method.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

SUMMARY

In accordance with a first aspect of the present disclosure, a communication device is provided, comprising: an ultra-wideband (UWB) communication unit configured to enable UWB communication with at least one external communication device, the UWB communication unit comprising a first receiver and a second receiver; a controller configured to control the UWB communication unit; wherein the controller is configured to cause the UWB communication unit to operate in a first mode in which the first receiver is alternately coupled to a first antenna and a second antenna; and wherein the controller is configured to cause the UWB communication unit to operate in a second mode in which the first receiver is coupled to the first antenna and the second receiver is coupled to the second antenna.

In one or more embodiments, the first mode of operation corresponds to a sequential angle-of-arrival (AoA) mode of operation and the second mode of operation corresponds to a concurrent AoA mode of operation.

In one or more embodiments, the first receiver is coupled to the first antenna through a first path; the second receiver is coupled to the second antenna through a second path; the first receiver is coupled to the second antenna through a third path; wherein each of the first, second and third path comprises a matching network and a controllable switch for switching the respective path to ground.

In one or more embodiments, the controller is configured to cause the UWB communication unit to operate in the first mode by deactivating the second receiver and by alternately switching the first path and the third path to ground, wherein the first path and third path are switched to ground by closing the controllable switch of the respective paths.

In one or more embodiments, the second receiver is deactivated upon or after switching the second path to ground, wherein the second path is switched to ground by closing the controllable switch of said second path.

In one or more embodiments, the controller is configured to cause the UWB communication unit to operate in the second mode by switching the third path to ground, wherein the third path is switched to ground by closing the controllable switch of said third path.

In one or more embodiments, each of the first, second and third path further comprises a pre-matching network.

In one or more embodiments, the controller is configured to change the mode of operation of the UWB communication unit from the first mode to the second mode, of from the second mode to the first mode, after a ranging round has been performed by the UWB communication unit.

In one or more embodiments, the controller is configured to change the mode of operation of the UWB communication unit from the first mode to the second mode, of from the second mode to the first mode, after a data frame has been received by the UWB communication unit.

In one or more embodiments, the controller is configured to change the mode of operation of the UWB communication unit in response to a control signal received from an external control system.

In one or more embodiments, the UWB communication unit further comprises a transmitter coupled to the first antenna.

In accordance with a second aspect of the present disclosure, a method of operating a communication device is conceived, comprising: enabling, by an ultra-wideband, UWB, communication unit comprised in the communication device, UWB communication with at least one external communication device, the UWB communication unit comprising a first receiver and a second receiver; controlling, by a controller comprised in the communication device, the UWB communication unit, wherein the controller causes the UWB communication unit to operate in a first mode in which the first receiver is alternately coupled to a first antenna and a second antenna, and in a second mode in which the first receiver is coupled to the first antenna and the second receiver is coupled to the second antenna.

In one or more embodiments, the controller changes the mode of operation of the UWB communication unit from the first mode to the second mode, of from the second mode to the first mode, after a ranging round has been performed by the UWB communication unit.

In one or more embodiments, the controller changes the mode of operation of the UWB communication unit from the first mode to the second mode, of from the second mode to the first mode, after a data frame has been received by the UWB communication unit.

In accordance with a third aspect of the present disclosure, a computer program is provided, comprising executable instructions which, when executed by a controller of a communication device, cause said controller to perform a method of the kind set forth.

DESCRIPTION OF DRAWINGS

Embodiments will be described in more detail with reference to the appended drawings, in which.

DESCRIPTION OF EMBODIMENTS

Figure 1:
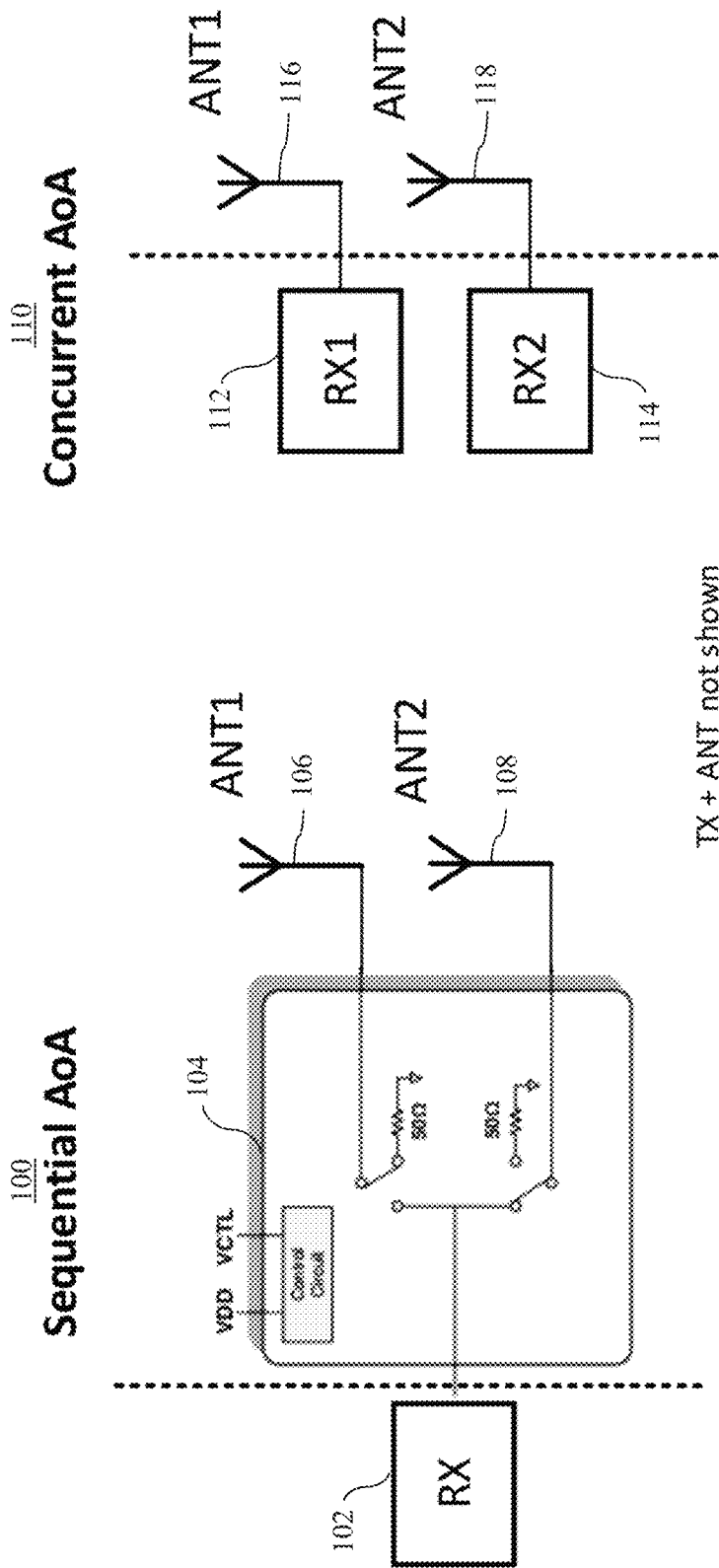
FIG. 1A shows an example of a sequential AoA implementation.
FIG. 1B shows an example of a concurrent AoA implementation.

As mentioned above, UWB is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications. For example, smart vehicle access systems may employ UWB technology to enable access to a vehicle or another object, in particular by facilitating ranging operations between an access device (e.g. a key fob or a mobile device) and one or more UWB anchors in the vehicle or other object.

In particular, UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode.

FIG. 1A shows an example of a sequential AoA implementation 100. It is noted that UWB-based two-dimensional AoA implementations are typically based on either concurrent operation of two receivers, wherein each receiver is connected to a separate antenna, or operation of one receiver with sequential switching of two antennas. The former may be referred to as a concurrent AoA implementation, while the latter may be referred to as a sequential AoA implementation. An example of the latter type of implementation is shown in FIG. 1A. In UWB systems an initiator typically exchanges messages containing data frames with a responder via a radio-frequency (RF) signal. If the responder comprises two receiving antennas, it can determine the two-dimensional AoA from the received RF signal. In the sequential AoA implementation 100, a single receiver 102 is sufficient. This receiver 102 is alternately coupled to a first antenna 106 and a second antenna 108 by means of controllable switches, which are included in a control block 104. For example, a control circuit included in the control block may alternately open and close the switches in the paths between the receiver 102 and the first antenna 106 and between the receiver 102 and the second antenna 108. When the respective switch is closed, the receiver 102 is coupled to the respective antenna. Furthermore, when the respective switch is open, the receiver 102 is not coupled to the respective antenna. Instead, the respective antenna may be coupled to ground through the respective switch. Thus, the receiver 102 may periodically be reconnected to a different one of the antennas 106, 108, for example after a predefined number of data frames has been received. Since only a single receiver 102 is needed, the power consumption is relatively low. However, an external control block (i.e., a control block which is external to the UWB chip including the receiver 102) is typically used to control the sequential switching between the different antennas 106, 108. This may result in a higher bill of materials (BOM), a higher system complexity and a larger printed circuit board (PCB) size.

FIG. 1B shows an example of a concurrent AoA implementation 110. In the concurrent AoA implementation 110, two receivers 112, 114 are used instead of one. Each of said receivers 112, 114 is coupled to a separate antenna 116, 118. Thus, two receivers 112, 114 are concurrently operated, and each receiver 112, 114 receives data frames through the antenna 116, 118 connected to it. This may result in a fully integrated solution in the sense that no external control block with switches is needed. The concurrent AoA implementation may result in a higher accuracy of the measured AoA compared to the sequential AoA implementation, but since two receivers 112, 114 are used, the power consumption is higher. This, in turn, may result in a reduced battery life in case the communication device is powered by a battery.

Now discussed are a communication device and a corresponding method of operating a communication device, which facilitate achieving an adequate trade-off between an acceptable power consumption and an acceptable measurement accuracy, in particular when AoA measurements are performed by the communication device.

Figure 2:
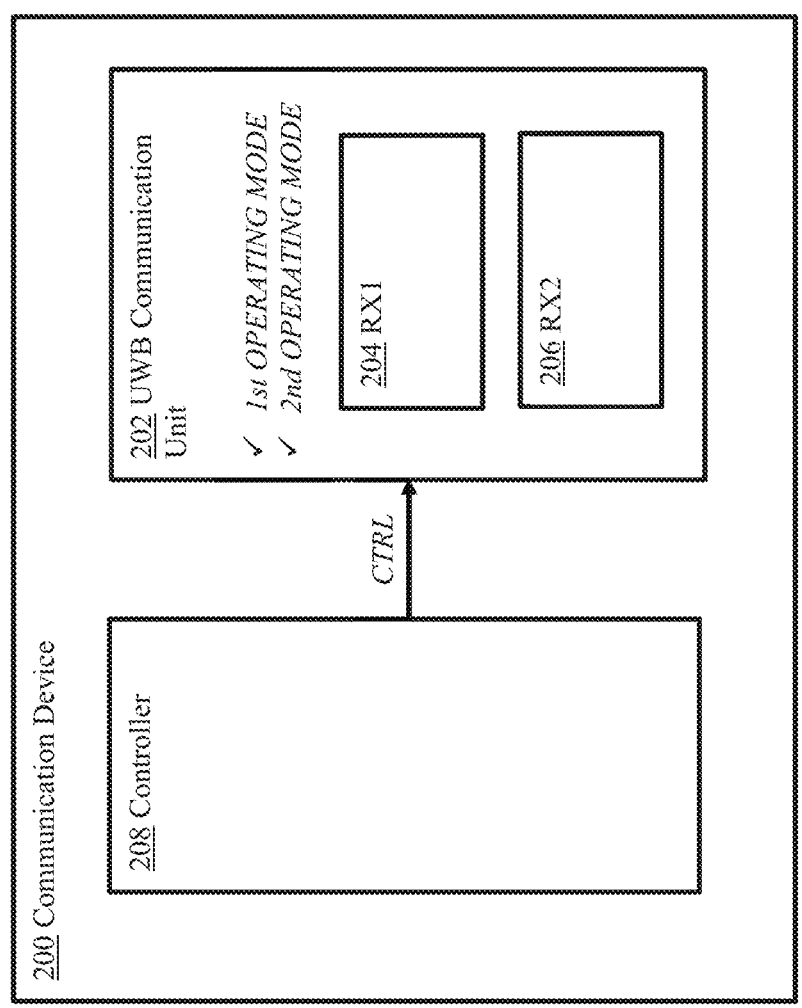
FIG. 2 shows an illustrative embodiment of a communication device.

FIG. 2 shows an illustrative embodiment of a communication device 200. The communication device 200 comprises a UWB communication unit 202 and a controller 208. The UWB communication unit 202 comprises a first receiver 204 and a second receiver 206. The UWB communication unit 202 is configured to enable UWB communication with at least one external communication device (not shown). Furthermore, the controller 208 is configured to control the UWB communication unit 202. In particular, the controller 208 is configured to cause the UWB communication unit 202, for example using a control signal, to operate in a first mode in which the first receiver 204 is alternately coupled to a first antenna and a second antenna. It is noted that the first antenna and second antenna, which are not shown, may be external to the communication device 200. For instance, if the communication device 200 is implemented as a UWB chip, the antennas are typically not integrated into the chip. Furthermore, the controller 208 is configured to cause the UWB communication unit 202 to operate in a second mode in which the first receiver 204 is coupled to the first antenna and the second receiver 206 is coupled to the second antenna. In this way, an adequate trade-off may be achieved between an acceptable power consumption and an acceptable accuracy. In particular, when the UWB communication unit 202 operates in the first mode, the power consumption may be decreased, at the cost of a lower accuracy. However, in case a higher accuracy is needed, the UWB communication unit 202 may be caused to operate in the second mode, in which the accuracy is higher, at the cost of a higher power consumption. Furthermore, in order to achieve said trade-off, no external control block of the kind shown in FIG. 1A is needed. Thus, a compact system implementation may be realized.

In one or more embodiments, the first mode of operation corresponds to a sequential AoA mode of operation and the second mode of operation corresponds to a concurrent AoA mode of operation. In this way, the communication device may easily be reconfigured to support different AoA modes of operation, which further facilitates achieving the desired trade-off. In particular, the sequential AoA mode of operation may result in a lower power consumption at the cost of a lower measurement accuracy, while the concurrent AoA mode of operation may result in a higher measurement accuracy at the cost of a higher power consumption. It is noted that the AoA mode of operation may be changed in dependence on the application requirements.

In one or more embodiments, the first receiver is coupled to the first antenna through a first path, the second receiver is coupled to the second antenna through a second path, and the first receiver is coupled to the second antenna through a third path. In these embodiments, each of the first, second and third path comprises a matching network and a controllable switch for switching the respective path to ground. In this way, the UWB communication unit may easily be controlled, i.e. caused to operate in the desired mode. More specifically, the respective path may be switched to ground via the switch, and the matching network may transform this ground into a high impedance (Zin="High-Z") that is seen when looking into this path, thereby effectively disabling said path. It is noted that a high impedance means that no RF current can flow into the path. In particular, the controller may be configured to cause the UWB communication unit to operate in the first mode by deactivating the second receiver and by alternately switching the first path and the third path to ground, wherein the first path and third path are switched to ground by closing the controllable switch of the respective paths. Furthermore, the second receiver may be deactivated upon or after switching the second path to ground, wherein the second path is switched to ground by closing the controllable switch of said second path. Accordingly, the second receiver may be disabled after the second path has been disabled, or the second receiver and the second path may be disabled simultaneously. Furthermore, the controller may be configured to cause the UWB communication unit to operate in the second mode by switching the third path to ground, wherein the third path is switched to ground by closing the controllable switch of said third path. This may result in a practical implementation of the presently disclosed communication device.

In one or more embodiments, each of the first, second and third path further comprises a pre-matching network. The use of a pre-matching network facilitates matching the impedance of the matching networks and switches comprised in said paths to the input impedances of the low-noise amplifiers (LNAs) comprised in the receivers. In one or more embodiments, the controller is configured to change the mode of operation of the UWB communication unit from the first mode to the second mode, of from the second mode to the first mode, after a ranging round has been performed by the UWB communication unit. In this way, an optimal mode of operation may be selected for each ranging round to be performed. Furthermore, in one or more embodiments, the controller is configured to change the mode of operation of the UWB communication unit from the first mode to the second mode, of from the second mode to the first mode, after a data frame has been received by the UWB communication unit. In this way, the mode of operation of the UWB communication unit can be changed frequently, for instance to take into account the accuracy requirements associated with particular data frames exchanged between the UWB communication unit and the external communication device. In a practical implementation, the controller is configured to change the mode of operation of the UWB communication unit in response to a control signal received from an external control system. Furthermore, in one or more embodiments, the UWB communication unit further comprises a transmitter coupled to the first antenna. In this way, the UWB communication unit is also able to transmit messages, in addition to receiving messages.

Figure 3:
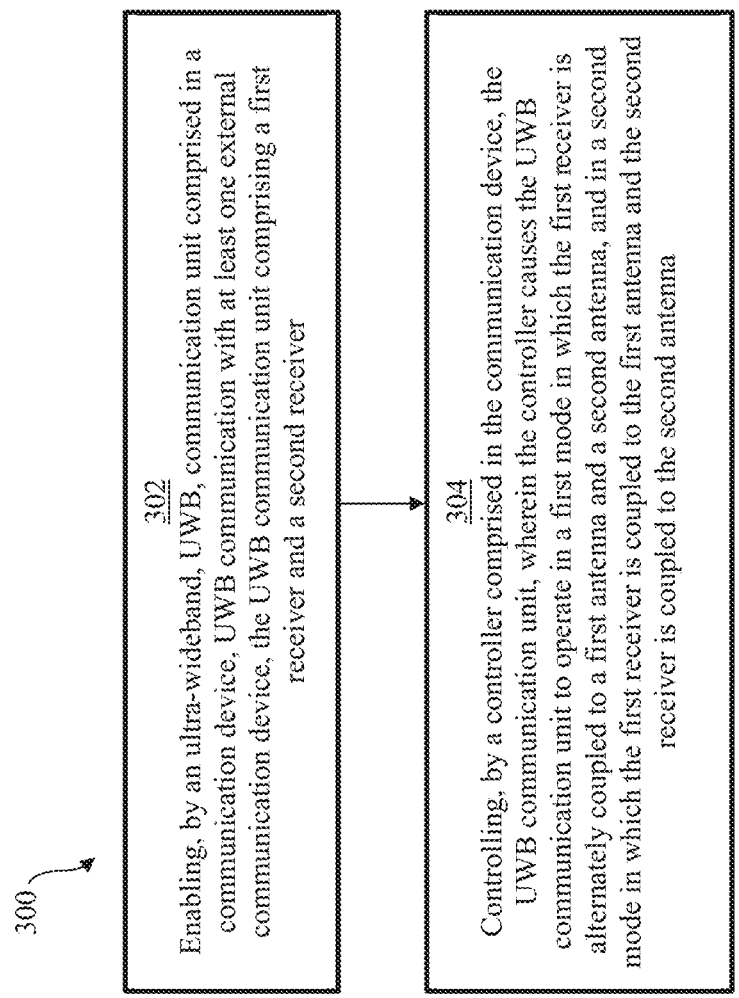
FIG. 3 shows an illustrative embodiment of a method of operating a communication device.

FIG. 3 shows an illustrative embodiment of a method 300 of operating a communication device. The method 300 comprises the following steps. At 302, a UWB communication unit comprised in a communication device enables UWB communication with at least one external communication device, wherein the UWB communication unit comprises a first receiver and a second receiver. Furthermore, at 304, a controller comprised in the communication device controls the UWB communication unit, wherein the controller causes the UWB communication unit to operate in a first mode in which the first receiver is alternately coupled to a first antenna and a second antenna, and in a second mode in which the first receiver is coupled to the first antenna and the second receiver is coupled to the second antenna. In this way, an adequate trade-off may be achieved between an acceptable power consumption and an acceptable accuracy.

Figure 4:
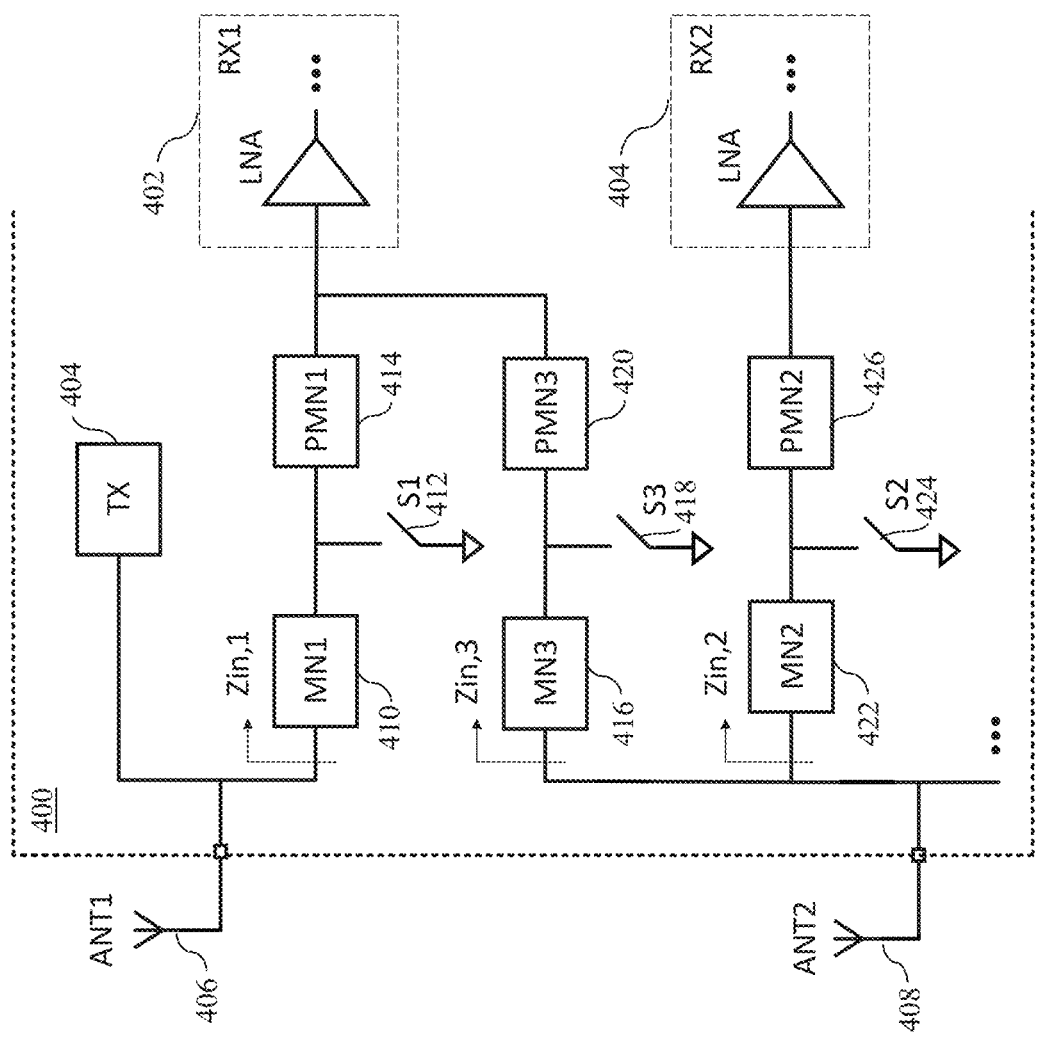
FIG. 4 shows another illustrative embodiment of a communication device.

FIG. 4 shows another illustrative embodiment of a communication device 400. The communication device 400 may be a UWB chip, which is connected to two antennas 406, 408. The communication device 400 includes a first receiver 402, which is coupled to the first antenna 406 through a first path. The first path contains a matching network (MN) 410, a switch 412 and an optional pre-matching network (PMN) 414. Furthermore, the communication device 400 comprises a second receiver 404, which is coupled to the second antenna 408 through a second path. The second path contains a matching network 422, a switch 424 and an optional pre-matching network 426. Furthermore, the first receiver 402 is coupled to the second antenna 408 through a third path, which contains a matching network 416, a switch 418 and an optional pre-matching network 420. The switches 412, 418, 424 of the different paths may be controlled by a controller (not shown) comprised in the communication device 400. By controlling the switches 412, 418, 424 in a predefined manner, the controller may cause the communication device 400 to operate in different AoA measurement modes. For example, by alternately coupling the first receiver 402 to the first antenna 406 and to the second antenna 408 through the first path and the third path, respectively, the communication device 400 may operate in a sequential AoA mode. When the communication device 400 operates in this mode, the second receiver 404 may be deactivated. Furthermore, by coupling the first receiver 402 to the first antenna 406 through the first path and the second receiver 404 to the second antenna 404 through the second path, the communication device 400 may operate in a concurrent AoA mode. In that case, the third path may be disabled. It is noted that the paths may be enabled by opening the switches in said paths. Furthermore, the paths may be disabled by closing the switches in said paths, which effectively switches the paths to ground.

Accordingly, the communication device 400 may be reconfigured in a flexible manner. It is noted that the communication device 400 may for example be implemented as an on-chip RF front-end module. By switching the communication device 400 into different modes of operation, both sequential AoA measurements and concurrent AoA measurements can be performed, without the need for an off-chip control block. Furthermore, it is noted that the matching networks 410, 416, 422 in the different paths ensure that, depending on the position of the switches 412, 418, 424 connected thereto, the impedance Zin seen from an antenna port into an RX chain is 50 Ohm in RX mode (when the respective switch is open) or high impedance in TX mode (when the respective switch is closed). The optional pre-matching network 414, 420, 426 matches the impedance of the matching network 410, 416, 422 and the switch 412, 418, 424 to the LNA input impedance. Since there are three paths, there are three input impedances Zin,1, Zin,2 and Zin,3.

The switch configuration for supporting the sequential AoA mode of operation is shown in Table 1. It is noted that only the state of the switches of the first path (S1) and third path (S3) are shown in Table 1. For this configuration, the switch of the second path (S2) may be closed, so that the second path is effectively switched to ground, the input impedance Zin,2 is high, and the second receiver may be deactivated. Furthermore, the switch configuration for supporting the concurrent AoA mode is shown in Table 2. It is noted that only the state of the switches of the first path (S1) and second path (S2) are shown in Table 1. For this configuration, the switch of the third path (S3) may be closed, so that the third path is effectively switched to ground and impedance Zin,3 is high. In Table 1 and Table 2, the value "0" indicates that a switch is open, while the value "1" indicates that a switch is closed.

TABLE 1

| S1 | S3 | Zin, 1 | Zin, 3 | TX | RX1 |
|----|----|--------|--------|------|------|
| 1 | 1 | High-Z | High-Z | ANT1 | — |
| 0 | 1 | 50 Ohm | High-Z | — | ANT1 |
| 1 | 0 | High-Z | 50 Ohm | — | ANT2 |

TABLE 2

| S1 | S2 | Zin, 1 | Zin, 2 | TX | RX1 | RX2 |
|----|----|--------|--------|------|------|------|
| 1 | 1 | High-Z | High-Z | ANT1 | — | — |
| 0 | 1 | 50 Ohm | High-Z | — | ANT1 | — |
| 1 | 0 | High-Z | 50 Ohm | — | — | ANT2 |

Figure 5:
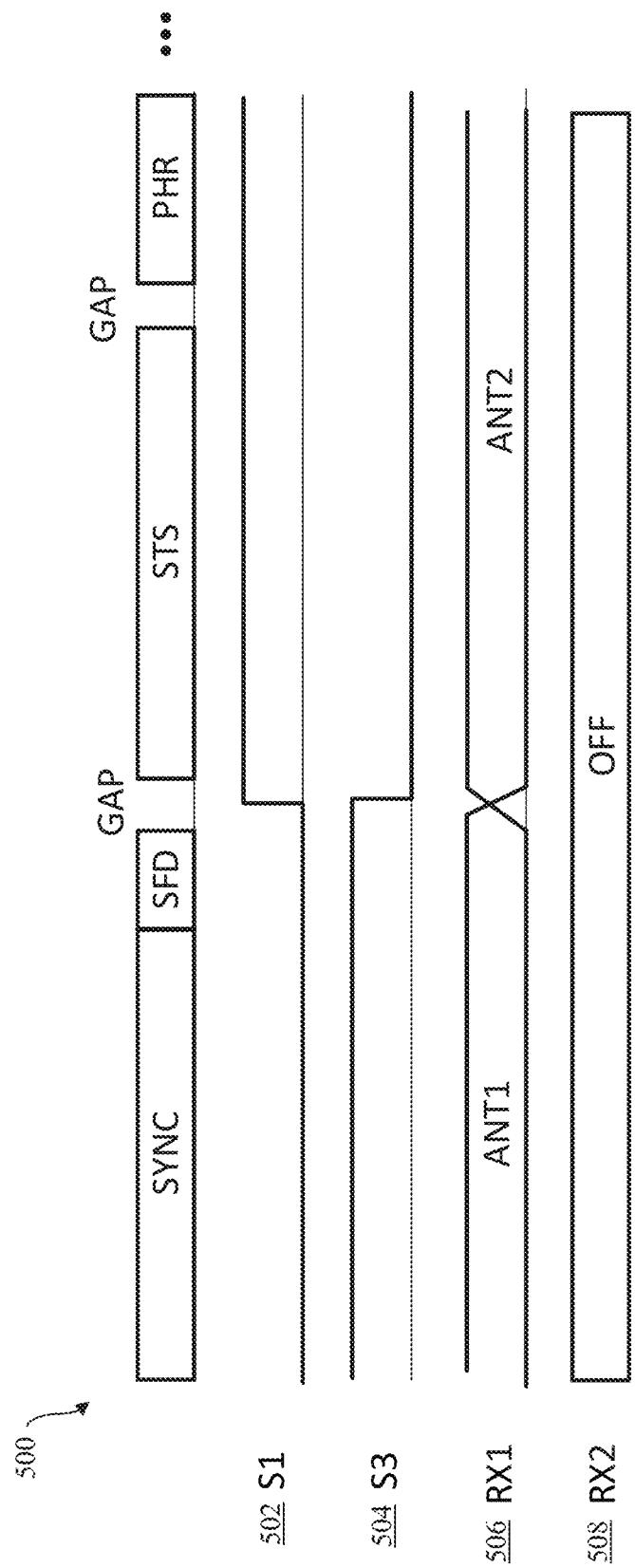
FIG. 5 shows an illustrative embodiment of a switching sequence.

FIG. 5 shows an illustrative embodiment of a switching sequence 500. While the switches may be configurated statically for the concurrent AoA mode, they should be configured dynamically for the sequential AoA mode. In other words, the first path and the third path should be enabled alternately, by alternately opening and closing the corresponding switches S1, S2 in a predefined manner. FIG. 5 shows an example of a switching sequence 500 for dynamically configuring the switches 502, 504 of the first path and the third path (S1 and S3). Initially, the first antenna (ANT1) is connected to the first receiver (RX1), while the second receiver (RX2) is deactivated, so switch S1 has the value "0" and switch S3 has the value "1". After the SYNC field and start of frame (SFD) field have passed, the antennas are switched during the gap, so that the second antenna (ANT2) is connected to the first receiver (RX1). Accordingly, switch S3 has the value "0" and switch S1 has the value "1", which activates the path from the second antenna (ANT2) to the first receiver (RX1). The gap during which the switching is performed facilitates the settling of transients' effects, such as impedance load changes. Optionally, the antennas may be switched again in the second gap after the secure training sequence (STS).

Figure 6:
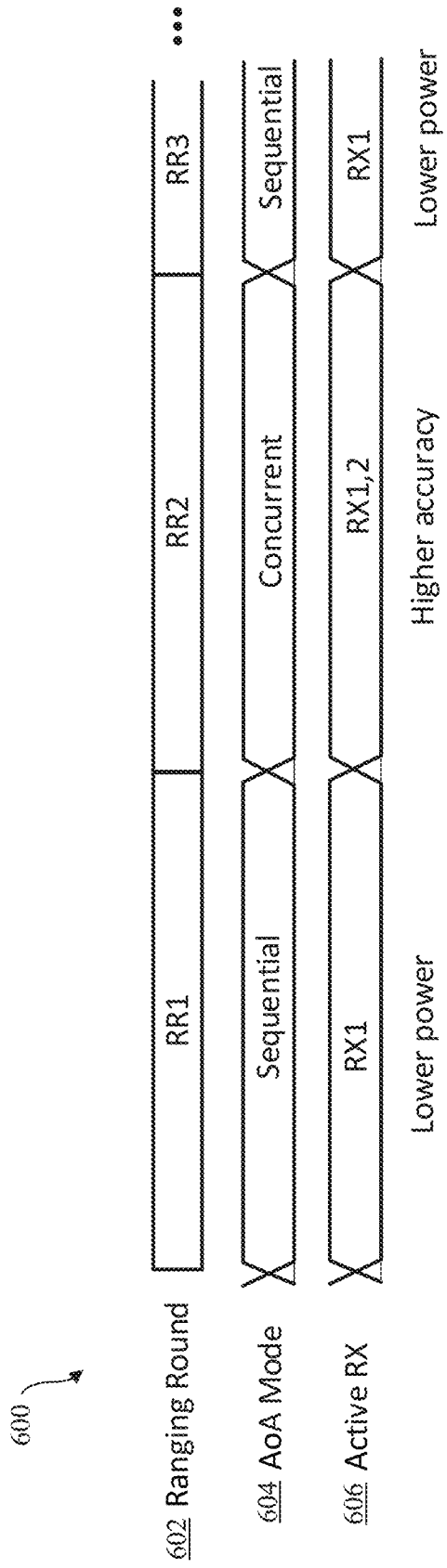
FIG. 6 shows an illustrative embodiment of switching an operating mode.

FIG. 6 shows an illustrative embodiment of switching an operating mode 600. In particular, it is shown how a UWB chip implementing the proposed RF front-end enables a compact AoA system where AoA accuracy can be traded with power consumption during operation. Assuming that an initiator performs multiple ranging rounds (RR) with a responder, the responder chip may switch the AoA mode during operation as follows. In a first ranging round (RR1) the chip is configured in a sequential AoA mode, in which it has a lower power consumption at the expense of a slightly lower accuracy. The switching between the different antennas in the sequential AoA mode may be performed as described as above. In a second ranging round (RR2) the chip is configured in a concurrent AoA mode, in which it has a higher accuracy, but also a higher current consumption. Finally, in a third ranging round (RR3) the chip is again configured in the sequential AoA mode. In general, there may be an arbitrary sequence of sequential-to-concurrent and concurrent-to-sequential mode transitions. Furthermore, the mode switching may not only be performed between ranging rounds, but also between data frames. In addition, the mode switching may be triggered by an external signal, for example a signal indicating that higher AoA accuracy is needed. It is noted that the front-end may easily be extended to cover additional RF pins and receiver chains, for example to support on-chip sequential and concurrent three-dimensional AoA measurements. Furthermore, an additional transmitter may be connected to the second antenna.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 sequential AoA implementation
102 receiver
104 control block
106 antenna
108 antenna
110 concurrent AoA implementation
112 receiver
114 receiver
116 antenna
118 antenna
200 communication device
202 UWB communication unit
204 receiver
206 receiver
208 controller
300 method of operating a communication device
302 enabling, by an ultra-wideband, UWB, communication unit comprised in a communication device, UWB communication with at least one external communication device, the UWB communication unit comprising a first receiver and a second receiver
304 controlling, by a controller comprised in the communication device, the UWB communication unit, wherein the controller causes the UWB communication unit to operate in a first mode in which the first receiver is alternately coupled to a first antenna and a second antenna, and in a second mode in which the first receiver is coupled to the first antenna and the second receiver is coupled to the second antenna
400 communication device
402 receiver
404 receiver
406 antenna 408 antenna
410 matching network
412 controllable switch
414 pre-matching network
416 matching network
418 controllable switch
420 pre-matching network
422 matching network
424 controllable switch
426 pre-matching network
500 switching sequence
502 control signal for switch
504 control signal for switch
506 receiver state
508 receiver state
600 operating mode switching
602 ranging round
604 AoA mode
606 active receiver

What is claimed is:

1. A communication device, comprising:
an ultra-wideband (UWB) communication unit configured to enable UWB communication with at least one external communication device, the UWB communication unit comprising a first receiver and a second receiver;
a controller configured to control the UWB communication unit;
wherein the controller is configured to deactivate the second receiver and cause the UWB communication unit to operate in a first mode in which the first receiver is alternately switched to receive a first signal from a first antenna and then to receive a second signal from a second antenna during at least one ranging round of a ranging operation; and
wherein the controller is configured to activate the second receiver and cause the UWB communication unit to operate in a second mode in which the first receiver is coupled to the first antenna and the second receiver is coupled to the second antenna.

2. The communication device of claim 1, wherein the first mode of operation corresponds to a sequential angle-of-arrival (AoA) mode of operation and the second mode of operation corresponds to a concurrent AoA mode of operation.

3. The communication device of claim 2, wherein:
the first receiver is coupled to the first antenna through a first path;
the second receiver is coupled to the second antenna through a second path;
the first receiver is coupled to the second antenna through a third path; and
wherein each of the first, second and third path comprises a matching network and a controllable switch for switching the respective path to ground.

4. The communication device of claim 2, wherein the controller is configured to change the mode of operation of the UWB communication unit from the first mode to the second mode, or from the second mode to the first mode, after a ranging round has been performed by the UWB communication unit.

5. The communication device of claim 2, wherein the controller is configured to change the mode of operation of the UWB communication unit from the first mode to the second mode, or from the second mode to the first mode, after a data frame has been received by the UWB communication unit.

6. The communication device of claim 1, wherein:
the first receiver is coupled to the first antenna through a first path;
the second receiver is coupled to the second antenna through a second path;
the first receiver is coupled to the second antenna through a third path; and
wherein each of the first, second and third path comprises a matching network and a controllable switch for switching the respective path to ground.

7. The communication device of claim 6, wherein, in the first mode, the controller is configured to switch the first path and third path to ground by closing the controllable switch of the respective paths.

8. The communication device of claim 7, wherein the second receiver is deactivated upon or after switching the second path to ground, wherein the controller is configured to switch the second path to ground by closing the controllable switch of said second path.

9. The communication device of claim 7, wherein the controller is configured to cause the UWB communication unit to operate in the second mode by switching the third path to ground, wherein the third path is switched to ground by closing the controllable switch of said third path.

10. The communication device of claim 6, wherein the controller is configured to cause the UWB communication unit to operate in the second mode by switching the third path to ground, wherein the third path is switched to ground by closing the controllable switch of said third path.

11. The communication device of claim 6, wherein each of the first, second and third path further comprises a pre-matching network.

12. The communication device of claim 1, wherein the controller is configured to change the mode of operation of the UWB communication unit from the first mode to the second mode, or from the second mode to the first mode, after a ranging round has been performed by the UWB communication unit.

13. The communication device of claim 12, wherein the controller is configured to change the mode of operation of the UWB communication unit in response to a control signal received from an external control system.

14. The communication device of claim 1, wherein the controller is configured to change the mode of operation of the UWB communication unit from the first mode to the second mode, or from the second mode to the first mode, after a data frame has been received by the UWB communication unit.

15. The communication device of claim 1, wherein the UWB communication unit further comprises a transmitter coupled to the first antenna.

16. The communication device of claim 1, wherein, in the first mode, the first receiver is alternately switched to receive from the first antenna or the second antenna during each gap of a UWB frame.

17. A method of operating a communication device, comprising:
enabling, by an ultra-wideband (UWB) communication unit comprised in the communication device, UWB communication with at least one external communication device, the UWB communication unit comprising a first receiver and a second receiver;
controlling, by a controller comprised in the communication device, the UWB communication unit to determine an angle of arrival (AoA) of received signals using one of a first mode or a second mode, wherein the controller causes the UWB communication unit to operate in the first mode in which the second receiver is disabled and the first receiver is alternately coupled to a first antenna to receive a first signal and then to a second antenna to receive a second signal, the UWB communication unit to provide an AoA determination using relatively lower power with relatively lower accuracy in the first mode, and in the second mode in which the first receiver is coupled to the first antenna and the second receiver is active and is coupled to the second antenna to provide the AoA determination using relatively higher power with relatively higher accuracy.

18. The method of claim 17, wherein the controller changes the mode of operation of the UWB communication unit from the first mode to the second mode, or from the second mode to the first mode, after a ranging round has been performed by the UWB communication unit.

19. The method of claim 18, wherein the controller changes the mode of operation of the UWB communication unit from the first mode to the second mode, or from the second mode to the first mode, after a data frame has been received by the UWB communication unit.

20. The method claim 17, wherein the controller changes the mode of operation of the UWB communication unit from the first mode to the second mode, or from the second mode to the first mode, after a data frame has been received by the UWB communication unit.

* * * * *